United States Patent [19]

Takahashi

[11] Patent Number: 5,046,187
[45] Date of Patent: Sep. 3, 1991

[54] METHOD AND APPARATUS FOR NOTIFYING COMPLETION OF DATA COMMUNICATION FOR MOBILE RADIO TELEPHONE

[75] Inventor: Chusei Takahashi, Tokyo, Japan

[73] Assignee: OKI Electric Industry Co., Ltd., Tokyo, Japan

[21] Appl. No.: 305,106

[22] Filed: Jan. 31, 1989

Related U.S. Application Data

[63] Continuation-in-part of Ser. No. 824,962, Jan. 31, 1986, abandoned.

[30] Foreign Application Priority Data

Feb. 8, 1985 [JP]  Japan ................................ 60-15807

[51] Int. Cl.⁵ ........................................... H04M 11/00
[52] U.S. Cl. ...................................... 379/93; 379/59; 379/97; 379/100
[58] Field of Search ...................... 379/59, 60, 93, 96, 379/97, 98, 100

[56] References Cited

U.S. PATENT DOCUMENTS 4,306,116 12/1981 McClure et al. .................... 379/98
4,524,244 6/1985 Faggin et al. ....................... 379/96
4,837,800 6/1989 Freeburg et al. ................... 379/59
4,881,129 11/1989 Mitsuhashi ........................ 379/100

FOREIGN PATENT DOCUMENTS

56-42440 4/1981 Japan .................................. 379/59
59-103462 6/1984 Japan ................................ 358/437

Primary Examiner—Jin F. Ng
Assistant Examiner—Stella L. Woo
Attorney, Agent, or Firm—Wenderoth, Lind & Ponack

[57] ABSTRACT

A mobile radiotelephone for speech communication and data communication using signals of a voice frequency in a voice frequency band, having a tone signal generating circuit and connected to a data terminal equipment. Data communication completion is monitored, and the tone signal generating circuit is actuated to generate a tone signal by the speaker of a handset upon the completion of data communication in order to notify the operator of the completion of data communication. The speaker of the handset can be made to sound by controlling the existing tone signal generating circuit for tone dial. Thus, the mobile radiotelephone is able to notify the operator of the completion of data communication without requiring any additional tone signal generating circuit specially for such a purpose.

3 Claims, 6 Drawing Sheets

Fig. 3

METHOD AND APPARATUS FOR NOTIFYING COMPLETION OF DATA COMMUNICATION FOR MOBILE RADIO TELEPHONE

This application is a continuation-in-part of application Ser. No. 06/824,962, filed Jan. 31,1986, now abandoned.

BACKGROUND OF THE INVENTION

1. Field of the Invention

The present invention relates to a mobile radiotelephone for data communication, and more particularly, to means for notifying the operator of the mobile radiotelephone of the completion of data communication.

2. Description of the Prior Art

In performing data communication by means of a mobile radiotelephone by using radio waves in a voice frequency band, first the operator picks up the handset to set the telephone set in an off-hook state, and dials the telephone number of the called party. Then, the telephone set of the called party rings. Then, the called party picks up the handset, and thereby the speaking circuit is connected. After the speaking circuit has been connected, a conversational mode or a speech communication mode is established.

When data communication is desired, the operator operates a changeover switch or the like to connect the speech signal line of the mobile radiotelephone set to a data MODEM, and thereby the conversational mode is changed for a data communication mode, in which the telephone sets are able to transmit and receive signals modulated and demodulated by the MODEM by using a radio wave in a voice frequency band.

In changing the conversational mode for the data communication mode, generally, the speech signal line is switched while the mobile radiotelephone set is in the off-hook state, and then data communication is started. Accordingly, a special notifying means is necessary to notify the operator of the completion of data communication including abnormal completion of data communication when the data communication mode is changed for the conversational mode upon the completion of data communication. For example, the mobile radiotelephone set is provided with a special tone ringing circuit, and the tone ringing circuit is actuated to generate a tone by a speaker or to flicker an indicator such as a LED upon the change of the data communication mode for the conversational mode. This conventional mobile radiotelephone system, however, requires a special tone ringing circuit or a special indicator to notify the operator of the completion of data communication. The mobile radiotelephone system employing the indicator, in particular, is dangerous because the operator is required to observe the indicator while the operator is driving the mobile vehicle.

SUMMARY OF THE INVENTION

Accordingly, it is an object of the present invention to provide a mobile radiotelephone which is used for speech communication and for data communication using a radio wave in a voice frequency range and is connected to a data terminal for data communication, capable of notifying the operator of the completion of data communication without using any special tone ringing circuit or any indicator upon the completion of data communication.

To achieve the object of the invention, the present invention provides a mobile radiotelephone comprising: a tone signal generating circuit for tone dial which generates at least one tone signal of an audio frequency upon the reception of a conversational mode restoration command signal which is transferred from a data MODEM to the handset to change the mode of the mobile radiotelephone from the data communication mode to the conversational mode; a transducer connected to the tone signal generating circuit and provided with a speaker which is actuated by the tone signal, a first communication circuit for the conversational mode, a second communication circuit for the data communication mode, a changeover switch connected to the first and second communication circuits and a communication line, and controlled by control signals to select the first communication circuit or the second communication circuit; a data terminal equipment connected through an input/output port to the second communication circuit; and a control circuit for controlling the general operations of the mobile radiotelephone, which monitors the status of the data terminal equipment through an input/output port, maintains a first communication circuit in an off-hook state when the status of the data terminal equipment is ON, and recognizes the completion of data communication, gives a control signal to the changeover switch to connect the communication line to the first circuit and gives a restoration command signal to the tone signal generating circuit when the status becomes OFF.

The above and other objects, features and advantages of the present invention will become more apparent from the following description taken in conjunction with the accompanying drawings.

BRIEF DESCRIPTION OF THE DRAWINGS

FIG. 1 shows the arrangement of FIGS. 1(a) and 1(b).

DETAILED DESCRIPTION OF THE PREFERRED EMBODIMENTS

Figure 1A:
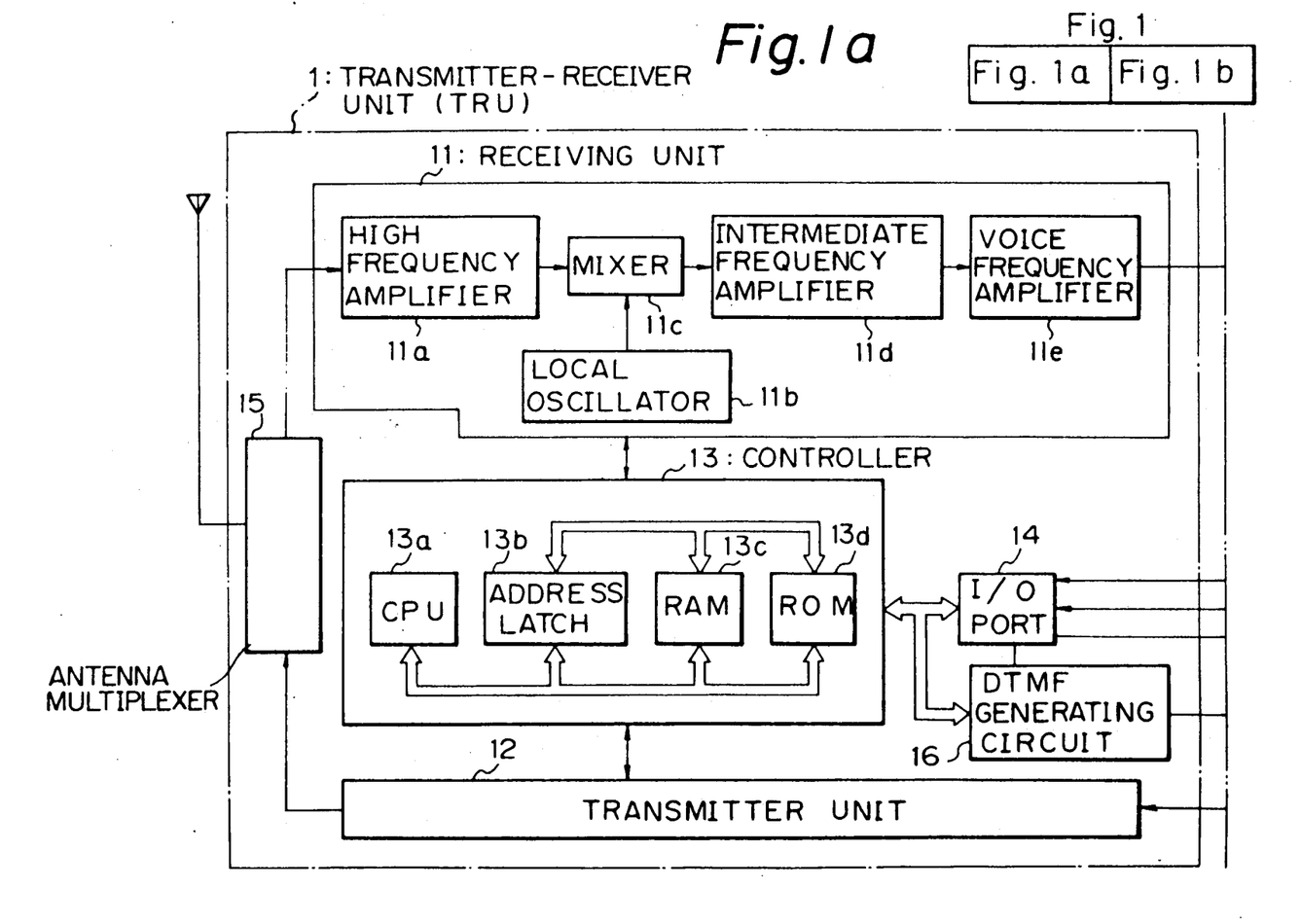
FIGS. 1(a) and 1(b) are block diagrams of a mobile radiotelephone for data communication, embodying the present invention.
Figure 1B:
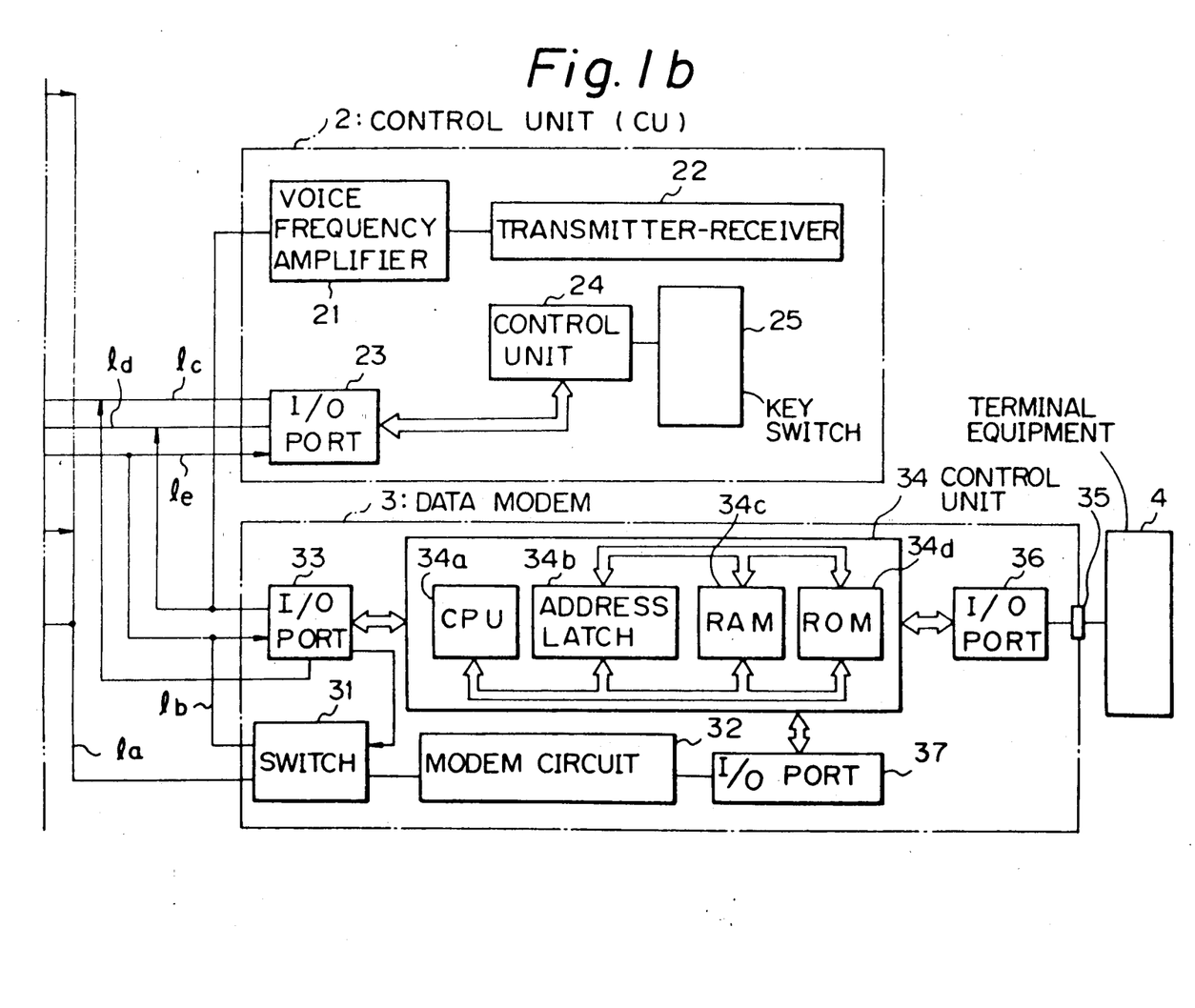

FIGS. 1(a) and 1(b) are block diagrams showing the constitution of a mobile radiotelephone for data communication, embodying the present invention.

Referring to FIG. 1(a), a transmitter-receiver unit (hereinafter abbreviated to "TRU") 1 comprises a receiving unit 11, a transmitting unit 12, a controller 13, an I/O port 14, an antenna multiplexer 15, and a DTMF generating circuit 16.

The receiving unit 11 comprises a high frequency amplifier 11a for amplifying a received signal (high frequency signal) received by an antenna and transferred thereto through the antenna multiplexer 15, a local oscillator 11b which generates a local frequency, a mixer 11c which mixes the frequency of a high frequency signal and a local frequency to provide an intermediate frequency signal, an intermediate frequency amplifier 11d which amplifies an intermediate frequency signal, controls the amplitude of the intermediate frequency signal and demodulate the intermediate frequency signal to provide a voice frequency signal, and a voice frequency amplifier 11e which amplifies the voice frequency signal provided by the intermediate frequency amplifier to a predetermined level.

The transmitting unit 12 is of well known type comprising a voice amplifier, an oscillator, a modulator, a frequency multiplier and a power amplifier (not shown).

The controller 13 consists essentially of a central processing unit (hereinafter abbreviated to "CPU") 13a, an address latch 13b, a random access memory (hereinafter abbreviated to "RAM") 13c, and a read-only memory (hereinafter abbreviated to "ROM") 13d. The controller 13 controls the general operation of the TRU 1 and provides a changeover command.

The I/O port 14 intermediates between a control unit (hereinafter abbreviated to "CU")2, which will be described afterward, and a data MODEM 3 for control data exchange through a forward data line d and a reverse data line e (hereinafter referred to as "F-data line" and "R-data line", respectively).

The antenna multiplexer 15 branches signals respectively having different frequencies, and transmitted or received through the antenna.

Referring to FIG. 1(b), the CU 2 comprises a voice frequency amplifier 21 which amplifies a voice frequency signal, a transmitter-receiver 22 including a speaker, an I/O port 23, a control unit 24 and key switches 25 which are operated respectively by dial keys and function keys, which are contained in the handset and handset holder of the mobile radiotelephone.

Control data produced by means of the key switches 25 and control unit 24 of the CU 2 is given through the I/O port 23 and the F-data line d to the TRU 1 and the control unit of the data MODEM 3. The transmitter-receiver 22 of the CU 2 is connected through the voice frequency amplifier 21, a voice signal line (hereinafter referred to as "signal line") b, the switch 31 of the MODEM 3, and a voice signal line (hereinafter referred to as "signal line") a to the receiving unit 11 and transmitting unit 12 of the TRU 1. The TRU 1, the CU 2 and the data MODEM 3 are interconnected by a hook switch line c.

The data MODEM 3 comprises the switch 31 for switching communication lines, a MODEM circuit 32, an I/O port 33, a control unit 34, an I/O port 36 and an RS-232c interface port 35. The switch 31 is controlled by the control unit 34 to selectively connect the signal line a connected to the receiving unit 11 and transmitting unit 12 of the TRU 1 to the CU 2 through the signal line b or to the MODEM circuit 32.

The MODEM circuit 32 is controlled through the I/O port 33 by the control unit 34 demodulates a data signal given thereto through the signal line a and the switch 31 from the TRU 1 and modulates a digital data signal given thereto through the port 35, the I/O port 36 and the control unit 34 from a terminal equipment 4.

The control unit 34 consists essentially of a CPU 34a, an address latch 34b, a RAM 34c and a ROM 34d. The control unit 34 decodes demodulated data (serial digital data) provided by the MODEM circuit 32 and encodes data given thereto through the port 35 from the terminal equipment 4.

The operation of the mobile radiotelephone in the conversational mode will be described hereinafter.

First, the operation for speech communication will briefly be explained. In the initial state, the signal lines a and b are connected through the switch 31 of the data MODEM 3. Accordingly, when the circuit is connected, a voice signal received by the TRU 1 and provided by the receiving unit 11 is transmitted through the signal line a, the switch 31, the signal line b and the voice frequency amplifier 21 to the transmitter-receiver 22. On the other hand, a voice signal is transmitted by the transmitter-receiver 22 is transmitted in the reverse order to the transmitting unit 12.

The operation of the mobile radiotelephone in the data communication mode will be described in detail hereinafter with reference to the flow charts shown in FIGS. 2(a) and 2(b).

First, the operator connects a power supply to the mobile radiotelephone and confirms a wake-up tone provided by the speaker, not shown, connected to the voice frequency amplifier 21 (step S1). Then, the operator calls a receiving party to connect the telephone circuit (step S2). When the telephone of the answering station is also in the data communication mode, an answer tone is heard. The operator operates the keyswitches 25 to give mode information for changing the mode from the conversational mode to the data communication mode (step S3). For example, the mode information is a combination of one or a plurality of numerals, one or a plurality of characters and/or one or a plurality of symbols.

The control unit 24 of the CU 2 recognizes the mode information thus provided and encodes the mode information in a series data signal and gives the series data signal through the I/O port 23 and the F-data line d to the TRU 1. The control unit 13 of the TRU 1 receives the encoded mode information through the I/O port 14 and recognizes the same (step S4).

After the recognition of the mode information, the control unit 13 gives a switching command through the R-data line e to the data MODEM 3 (step S5).

The control unit 34 of the data MODEM 3, which has been in an idle state, receives the switching command through the I/O port 33 and recognizes the same, and then the data MODEM 3 changes the operating mode thereof from the conversational mode to the data communication mode for the following operations (step S6)

First, the control unit 34 monitors the status of the data terminal ready line (hereinafter abbreviated to "DTR line") of the RS-232C interface port 35 (step S7), and then, when the terminal equipment 4 is ON, gives a hook signal through the hook switch line c to the control unit 13 of the TRU 1 (step 8). The hook signal corresponds to an off-hook signal for the conversational mode. The hook signal requests holding the telephone circuit. That is, ordinarily, the hook switch line c is in the off-hook state upon the establishment of the conversational mode for speech communication by picking up the handset. Usually, the operator puts the handset on a cradle, not shown, after the conversational mode has been changed for the data communication mode. Accordingly, the MODEM keeps the hook switch line c in the off-hook state until the termination of data communication.

Then, the control unit 34 controls the switch 34 to disconnect the signal line a from the signal line b and connects the signal line a to the MODEM circuit 32 (step S9). Consequently, the mode of the mobile radiotelephone is changed from the conversational mode to the data communication mode.

When the TRU 1 is an answering station, the TRU 1 starts receiving a modulated signal, for example, a FSK signal or a PSK signal, from the originating station. The receiving unit 11 sends the received modulated signal through the signal line a and the switch 31 to the MODEM circuit 32 of the data MODEM 3. The MODEM circuit 32 of the data MODEM 3 demodulates the received modulated signal, converts the demodulated signal into a digital signal, and then stores the digital signal in the RAM 34c of the control unit 34. The stored demodulated data is processed for decoding or the like by the control unit 34, and then the decoded data is given through the I/O port 36 and the RS-232C interface port 35 to the terminal equipment 4.

Figure 3:
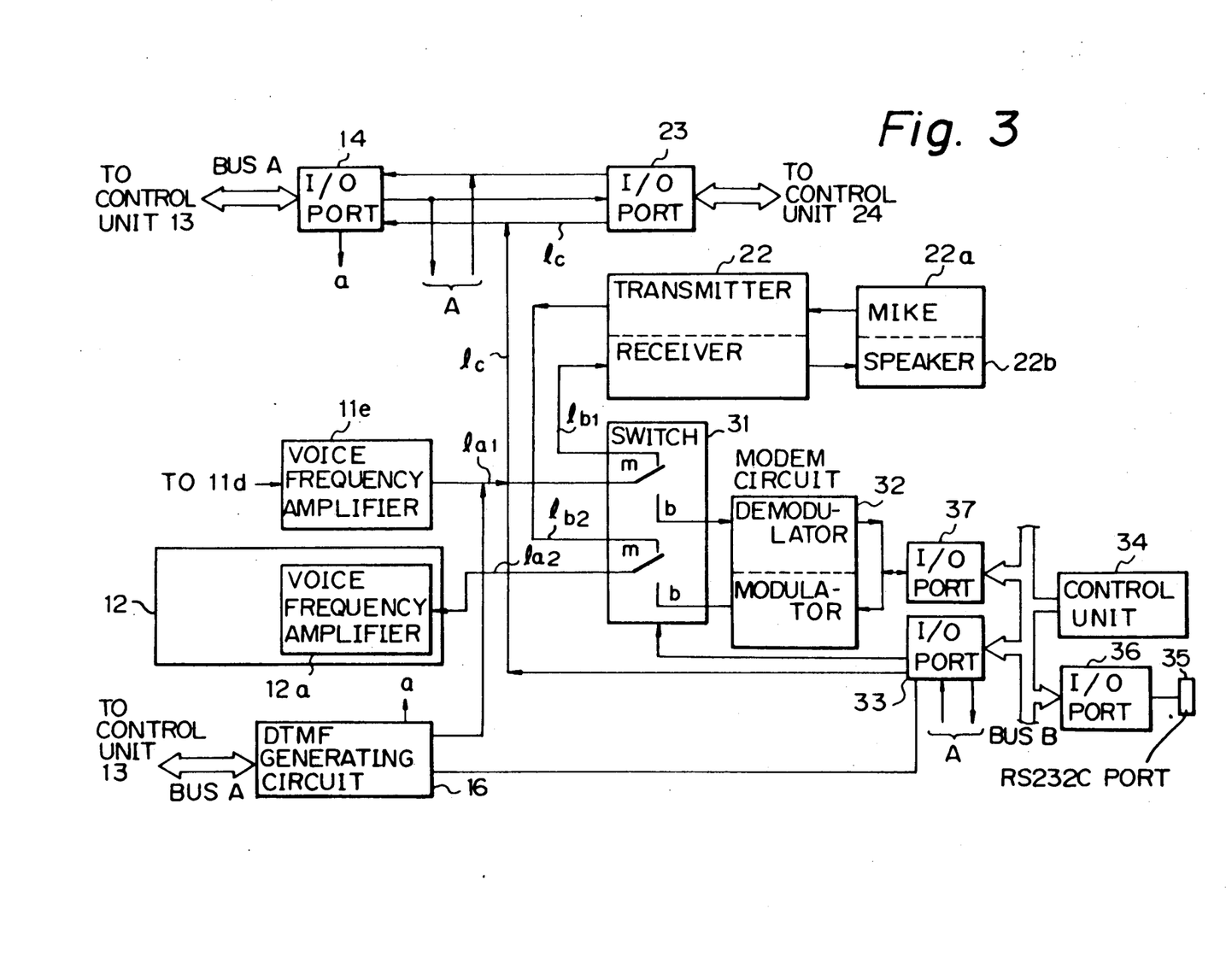
FIG. 3 is a detailed block diagram of a mobile radiotelephone for data communication, embodying the present invention.

The functions of the components relating to the foregoing operations will be described in detail with reference to FIG. 3 showing the constitution of the essential portion of the mobile radiotelephone of the present invention.

In changing the conversational mode for the data communication mode, the control unit 34, upon the recognition of the switching command, monitors the status of the DTR line of the RS-232C interface port 35 through the I/O port 36. In this embodiment, the I/O port 36 is an integrated circuit equivalent to MSM82C51 (Oki Electric Industry Co., Ltd.), namely, a programmable universal synchronous/asynchronous receiver/transmitter (USART) capable of being used for data communication in combination with an 8-bit CPU.

When DTR is ON, the control unit 34 provides a control signal for changing over the switch 31 through a bus B and the I/O port 33. In this embodiment, the I/O ports 14, 23 and 33 are 2-kbit RAMs each having a programmable I/O port and a timer, and are capable of readily transferring data in response to an IN or OUT command given thereto from an external CPU.

The contact of the switch 31 is changed from a contact m to a contact b by the control signal to establish the data communication mode.

On the other hand, immediately after the switch 31 has thus been controlled, the control unit 34 provides a command through the I/O port 33 to keep the hook switch line c in the off-hook state until the termination of data communication in order that data communication will not be affected electrically even when the transmitter-receiver 22 is placed in the on-hook state, for example, by putting the handset on the cradle, during data communication.

Referring again to FIG. 2, operation for changing the mode of the mobile radiotelephone from the data communication mode to the conversational mode will be described hereinafter.

During data communication (step S10), the control unit 34 monitors the status of the DTR line of the RS-232C interface port 35 in addition to the data processing operation. Upon the change of the status of the DTR line from ON to OFF, the control unit 34 decides that the data communication has terminated (step S11). Then, the control unit 34 gives a control signal through the I/O port 33 to the switch 31 to change the contact of the switch 31 from the contact b to the contact m (step S12). Substantially in synchronism with the changeover operation of the switch 31, the control unit 34 gives a command signal, namely, a restoration command signal, to actuate the DTMF generator 16 through the bus B (FIG. 3), the I/O port 33, the F-data line d and the I/O port 14 to the control unit 13 of the TRU 1 (step S13).

Upon the reception of the restoration command signal, the control unit 13 gives a start command signal through a bus A (FIG. 3) to the DTMF generator 16. Upon the reception of the start command signal, the DTMF generator selects a signal of 1633 Hz from the DTMF and oscillates (step S14).

The DTMF generator 16 applies the output thereof to a signal line $a_1$, and then the output of the DTMF generator 16 is applied through a signal line $b_1$ to the speaker 22b of the transmitter-receiver 22. The speaker 22b generates an audible signal of 1633 Hz as a restoration tone for notifying the operator of the completion of data communication (step S15).

Upon the recognition of the OFF state of the DTR, the control unit 34 sets a software timer for about 1 sec to make the speaker 22b generate the restoration tone for about 1 sec. At the end of the preset time interval for which the software timer was set, the control unit 34 provides a control signal through the bus B and the I/O port 33 to set the hook switch line c in the on-hook state and to disconnect the mobile radiotelephone from the telephone line (step S16). The set count of the timer of the control unit 13 decides the duration of the restoration tone.

Figures 2, 2A:
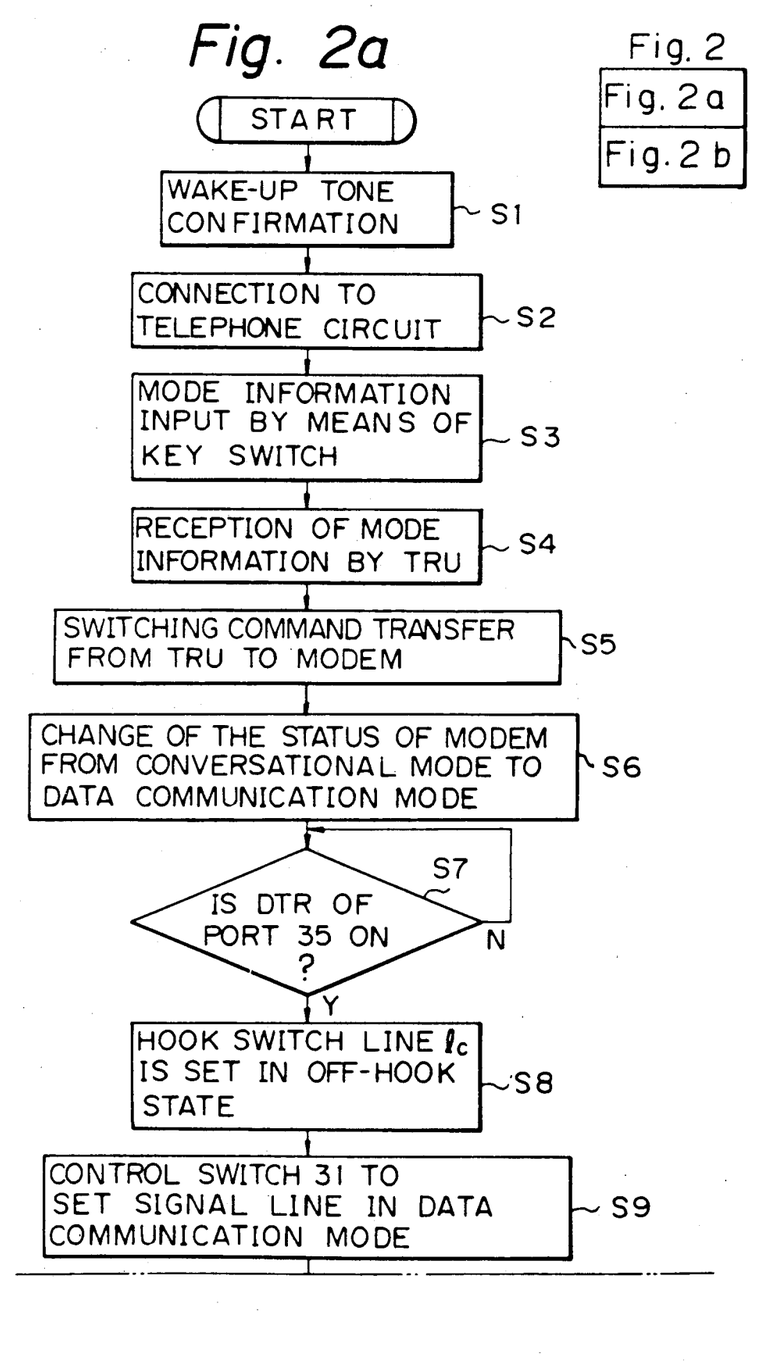
FIGS. 2(a) and 2(b) are flow charts of assistance in explaining operations for changing the operating mode of the mobile radiotelephone of FIG. 1 from the conversational mode to the data communication mode or from the data communication mode to the conversational mode.
Figure 2B:
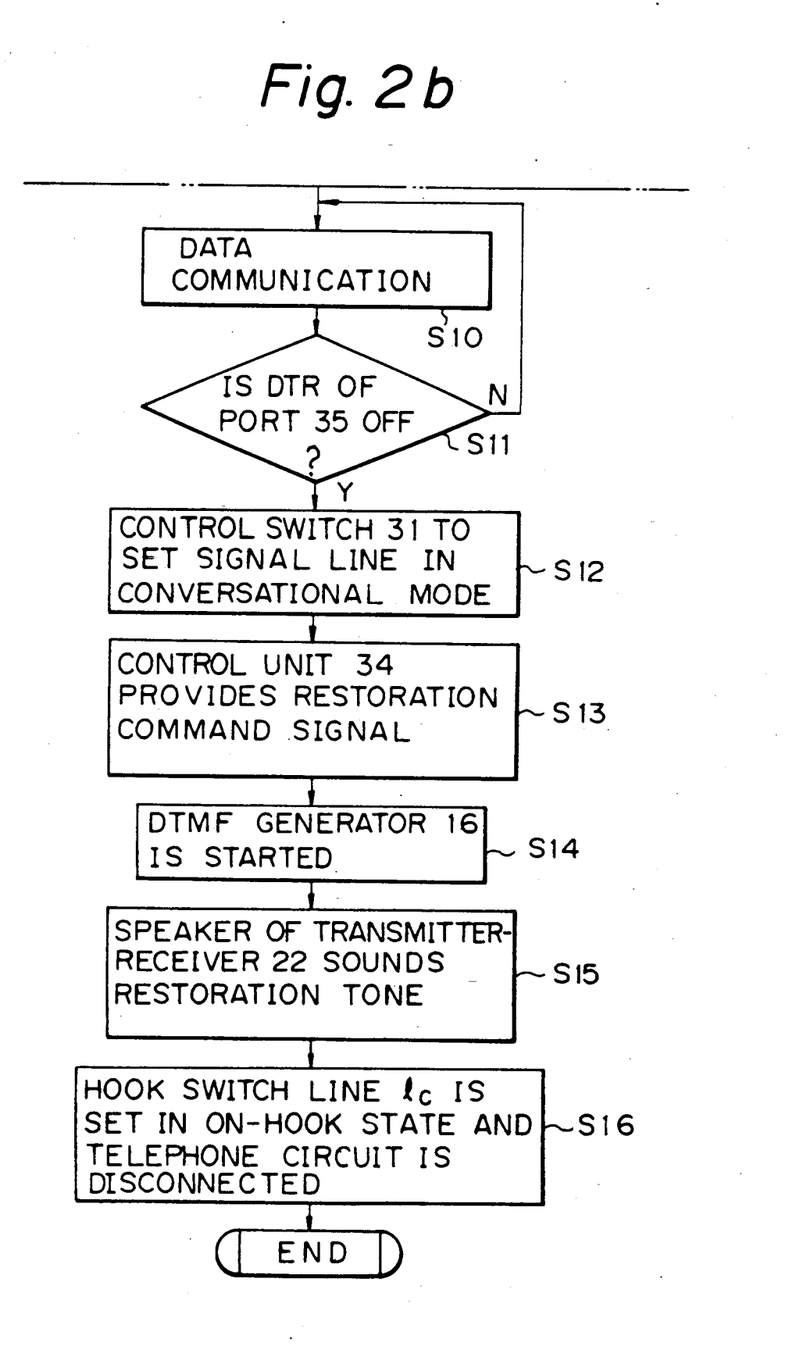
Figure 4:
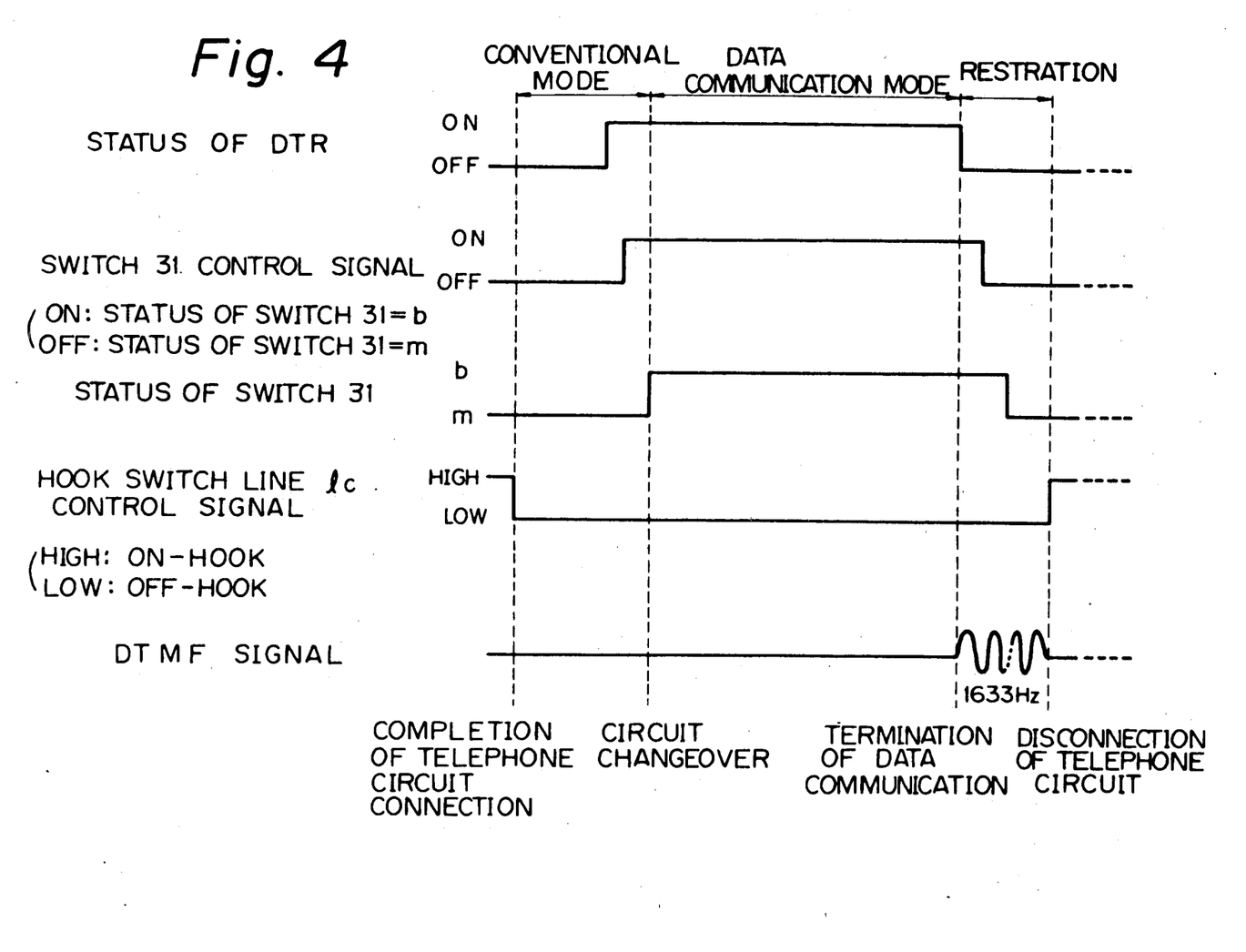
FIG. 4 is a time chart of assistance in explaining the operation of the components of a mobile radiotelephone for data communication, embodying the present invention, showing the respective statuses of signals.

Steps of the operation of the mobile radiotelephone shown in FIG. 2 will better be understood when reference is made to a time chart of FIG. 4 showing the respective statuses of the signals.

Although the invention has been described in its preferred form with a certain degree of particularity, it is to be understood that many variations and changes are possible in the invention without departing from the scope thereof.

What is claimed is:

1. In a mobile radiotelephone for data communication, comprising a tone signal generating circuit for generating a dial tone, a transmitter-receiver having a speaker connected to said tone signal generating circuit, and a control circuit for controlling the general operation of said mobile radiotelephone, connected through an I/O port to a data terminal equipment, and a changeover switch for changing the connection of a circuit for the conversational mode to a communication channel to the connection of a circuit for the data communication mode to enable data communication, a method for notifying completion of data communication for a mobile radio telephone comprising steps in which:
   (a) said control circuit maintains said circuit for the conversational mode in an off-hook state during the operation of said data terminal equipment for data communication;
   (b) said control circuit monitors the status of said data terminal equipment through said I/O port during data communication, and provides a control signal to said changeover switch upon the recognition of the completion of data communication from the detection of the change of the status of said data terminal equipment to an OFF state;

(c) said changeover switch changes the connection of the communication channel to said circuit for the data communication mode for the connection of the communication channel to said circuit for the conversational mode upon the reception of said control signal from said control circuit;

(d) said control circuit feeds a restoration command signal to said tone signal generating circuit after transmitting said control signal;

(e) said tone signal generating circuit, upon the reception of said restoration command signal, feeds a tone signal of at least one audible frequency in an audible frequency band to said speaker of said transmitter-receiver while said restoration command signal is applied thereto, to notify the operator of said mobile radiotelephone of the completion of data communication; and (f) said control circuit places said circuit for the conversational mode in the on-hook state after sending out said restoration command signal for a predetermined time period to disconnect said mobile radiotelephone from the telephone line.

2. A method for notifying completion of data communication according to claim 1, wherein said control circuit monitors the status of a DTR signal at said I/O port of an RS-232C standard in the step (b), and decides that data communication is completed upon the recognition of the change of said status of the DTR signal to an OFF state.

3. In a mobile radiotelephone for data communication, an apparatus for notifying completion of data communication for mobile radio telephone comprising:

(a) a tone signal generating circuit for tone dialing which generates a tone signal of at least one audio frequency in an audible frequency band upon the reception of a restoration command signal for a period corresponding to the duration of said restoration command signal;

(b) a transmitter-receiver connected to said tone signal generating circuit, and having a speaker which is operated by said tone signal;

(c) a first communication circuit for the conversational mode;

(d) a second communication circuit for the data communication mode;

(e) a changeover switch connected to said first communication circuit, said second communication circuit and a communication channel to connect said first communication circuit or said second communication selectively to the communication channel according to a control signal;

(f) a data terminal equipment connected through an I/O port to said second communication circuit; and (g) a control circuit for controlling the general operation of said mobile radiotelephone, which monitors the status of said data terminal equipment through said I/O port, maintains said first communication circuit in an off-hook state while said data terminal equipment is in an ON state, decides that data communication has been completed, feeds said control signal to said changeover switch to connect said first communication circuit to said communication channel and feeds said restoration command signal to said tone generating circuit for a predetermined time period when the status of said data terminal equipment changes from the ON state to an OFF state, and then changes the status of said first communication circuit from the off-hook state to the on-hook state to disconnect said mobile radiotelephone from the telephone circuit.

* * * * *